(12) United States Patent
Smith

(10) Patent No.: US 11,035,300 B2
(45) Date of Patent: Jun. 15, 2021

(54) CONTROL OF A GAS TURBINE DRIVING A GENERATOR OF AN ELECTRICAL SYSTEM BASED ON FAULTS DETECTED IN THE ELECTRICAL SYSTEM

(71) Applicant: Rolls-Royce Corporation, Indianapolis, IN (US)

(72) Inventor: Alan W. Smith, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 3 days.

(21) Appl. No.: 16/370,093

(22) Filed: Mar. 29, 2019

(65) Prior Publication Data

US 2020/0309039 A1    Oct. 1, 2020

(51) Int. Cl.
| | |
|---|---|
| *F02N 11/04* | (2006.01) |
| *H02P 9/04* | (2006.01) |
| *F02C 9/46* | (2006.01) |
| *H02K 7/18* | (2006.01) |
| *H02P 11/00* | (2006.01) |
| *H02P 101/25* | (2016.01) |

(52) U.S. Cl.
CPC .............. *F02C 9/46* (2013.01); *H02K 7/1823* (2013.01); *H02P 11/00* (2013.01); *F05D 2220/76* (2013.01); *F05D 2270/31* (2013.01); *H02P 2101/25* (2015.01)

(58) Field of Classification Search
CPC ..... F02C 9/26; F02C 9/46; F02C 9/56; H02K 7/1823; H02P 11/00; H02P 2101/25; F05D 2220/76; F05D 2270/31
See application file for complete search history.

(56) References Cited

U.S. PATENT DOCUMENTS

| | | | | |
|---|---|---|---|---|
| 3,973,539 A * | 8/1976 | Jones | ............... | F02D 41/407 123/359 |
| 4,057,736 A * | 11/1977 | Jeppson | ............... | H02J 3/00 307/78 |
| 4,262,209 A * | 4/1981 | Berner | ............... | F02G 5/02 290/7 |
| 4,314,441 A * | 2/1982 | Yannone | ............... | F02C 9/28 60/39.281 |
| 5,550,410 A * | 8/1996 | Titus | ............... | H02J 3/36 174/DIG. 15 |
| 6,555,929 B1 * | 4/2003 | Eaton | ............... | F02D 11/105 290/24 |
| 6,921,985 B2 * | 7/2005 | Janssen | ............... | F03D 7/0224 290/44 |

(Continued)

OTHER PUBLICATIONS

"Seconds From Disaster—Overspeed Devices," Power Services Group, Dec. 4, 2018, 3 pp.

*Primary Examiner* — Tulsidas C Patel
*Assistant Examiner* — Thomas K Quigley
(74) *Attorney, Agent, or Firm* — Shumaker & Sieffert, P.A.

(57) ABSTRACT

An example system includes a gas-turbine configured to generate mechanical energy using fuel; an electrical generator configured to generate electrical energy using the mechanical energy generated by the gas-turbine; an electrical converter configured to process the electrical energy generated by the electrical generator; and a converter controller configured to reduce, responsive to detecting occurrence of a fault in the electrical generator or the electrical converter, an amount of fuel provided to the gas-turbine.

18 Claims, 2 Drawing Sheets

(56) References Cited

U.S. PATENT DOCUMENTS

| | | | | |
|---|---|---|---|---|
| 7,122,916 | B2* | 10/2006 | Nguyen | F01D 13/00 307/57 |
| 7,468,561 | B2* | 12/2008 | Kern | H02P 9/302 290/4 A |
| 8,212,371 | B2* | 7/2012 | Maibach | H02K 19/34 290/44 |
| 8,742,609 | B2* | 6/2014 | Helle | F03D 80/60 290/44 |
| 8,912,672 | B2* | 12/2014 | Pendray | H02P 9/107 290/41 |
| 9,689,316 | B1* | 6/2017 | Crom | F02C 9/42 |
| 9,765,640 | B2* | 9/2017 | Smith | F01D 15/10 |
| 9,803,553 | B2* | 10/2017 | Smith | F02C 7/26 |
| 10,122,308 | B2* | 11/2018 | Turpin | H02P 9/04 |
| 10,263,552 | B2* | 4/2019 | Noderer | H02P 9/04 |
| 10,344,680 | B2* | 7/2019 | Babkov | F02C 9/00 |
| 10,589,635 | B1* | 3/2020 | Solodovnik | B60L 15/2045 |
| 10,634,080 | B2* | 4/2020 | Graus | F02D 41/0007 |
| 2002/0175521 | A1* | 11/2002 | Dunsworth | F02D 41/083 290/40 A |
| 2003/0015873 | A1* | 1/2003 | Khalizadeh | H02P 9/307 290/7 |
| 2004/0053093 | A1* | 3/2004 | Colborn | H01M 8/0491 429/430 |
| 2004/0074223 | A1* | 4/2004 | Willis | F02C 7/232 60/39.094 |
| 2004/0245783 | A1* | 12/2004 | Gilbreth | H02J 1/10 290/52 |
| 2007/0013195 | A1* | 1/2007 | Mukavetz | F04D 27/0246 290/52 |
| 2010/0241283 | A1* | 9/2010 | Desai | H02J 7/1415 700/295 |
| 2014/0015257 | A1* | 1/2014 | Dobbs | F02D 41/0007 290/40 B |
| 2014/0060066 | A1* | 3/2014 | Hesse | F02C 9/00 60/773 |
| 2015/0326022 | A1* | 11/2015 | Baragona | H02J 4/00 307/31 |
| 2020/0056497 | A1* | 2/2020 | Terwilliger | F02C 7/277 |

* cited by examiner

US 11,035,300 B2

CONTROL OF A GAS TURBINE DRIVING A GENERATOR OF AN ELECTRICAL SYSTEM BASED ON FAULTS DETECTED IN THE ELECTRICAL SYSTEM

TECHNICAL FIELD

This disclosure relates to the control of a gas turbine that is powering an electric generator to provide electrical power.

BACKGROUND

One method to produce electrical power in a vehicle or system is through the use of a prime mover or internal combustion engine to drive an electric generator. A gas turbine engine is a type of internal combustion engine or prime mover that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

SUMMARY

In one example, a system includes a gas-turbine configured to generate mechanical energy using fuel; an electrical machine operating as an electrical generator configured to generate electrical energy using the mechanical energy generated by the gas-turbine; an electrical converter configured to process the electrical energy generated by the electrical generator; and a converter controller configured to reduce, responsive to detecting occurrence of a fault in the electrical converter, an amount of fuel provided to the gas-turbine.

In another example, a method includes controlling, by a converter controller, operation of an electrical converter configured to process electrical energy generated by an electrical generator from mechanical energy derived from a gas-turbine; detecting, by the converter controller, occurrence of a fault in the electrical converter; and responsive to detecting the occurrence of the fault, reducing, by the converter controller, an amount of fuel provided to the gas-turbine.

In another example, an airframe includes a gas-turbine configured to generate mechanical energy using fuel; a fuel valve configured to control an amount of fuel provided to the gas-turbine; an electrical generator configured to generate electrical energy using mechanical energy derived from the gas-turbine; an electrical converter configured to process the electrical energy generated by the electrical generator; and a converter controller coupled to the electrical converter and the fuel valve, the converter controller configured to cause the fuel valve to reduce, responsive to detecting occurrence of a fault in the electrical converter, an amount of fuel provided to the gas-turbine.

The details of one or more examples are set forth in the accompanying drawings and the description below. Other features, objects, and advantages will be apparent from the description and drawings, and from the claims.

DETAILED DESCRIPTION

Figure 1:
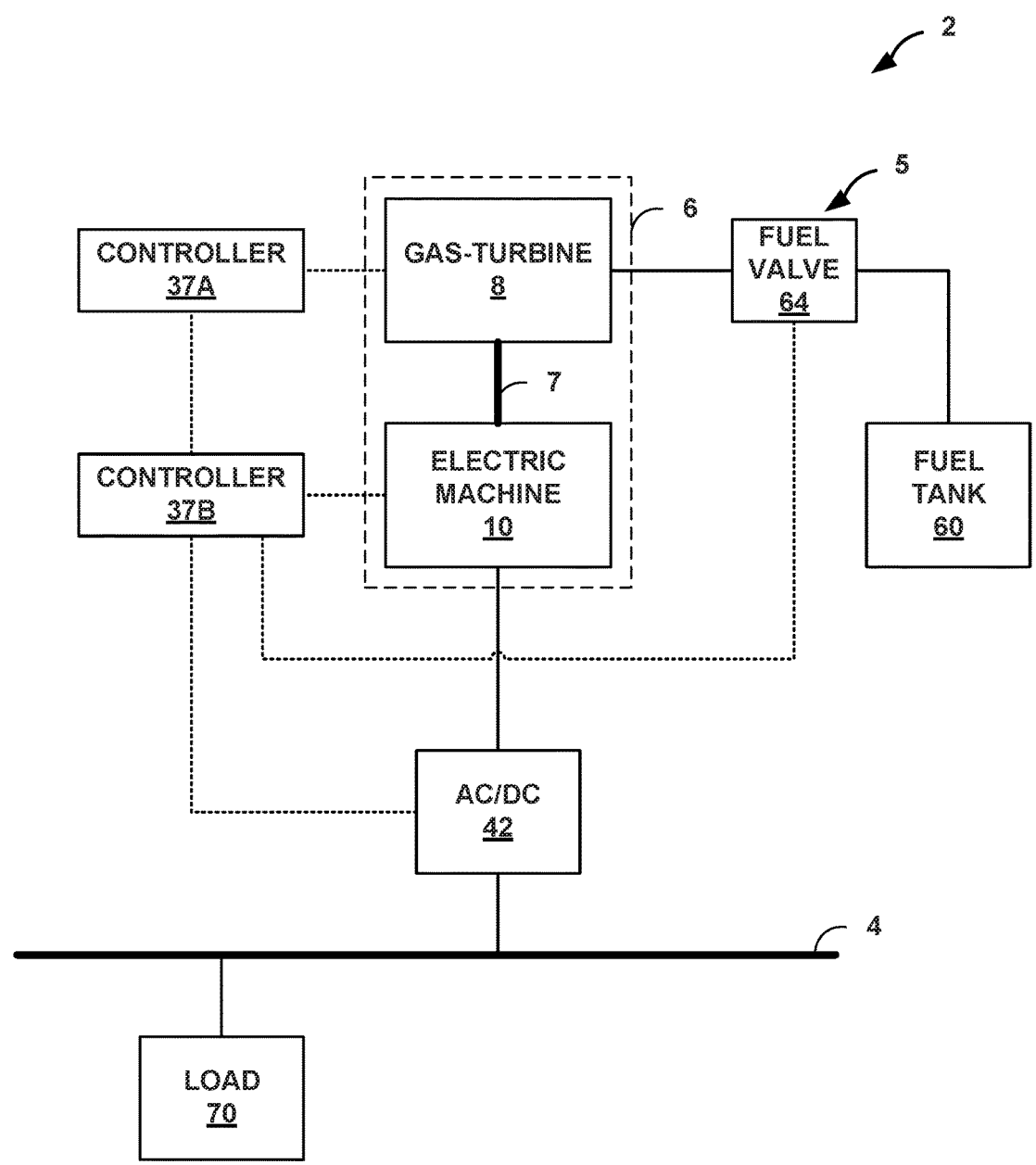
FIG. 1 is a conceptual block diagram illustrating further details of an example system, in accordance with one or more techniques of this disclosure.

Vehicles or systems may include gas-turbines that convert chemical potential energy (e.g., fuel) to mechanical energy, and electrical generators that convert the mechanical energy to electrical power. In some examples, the electrical power generated by an electrical generator may be converted/conditioned or otherwise processed by a converter. For instance, where the electrical generator generates alternating current (AC) electrical power, the vehicle may include a converter or a rectifier) to convert the AC electrical power into direct current (DC) electrical power.

The vehicle may include a converter controller (hereinafter, "CC") to control operation of the converter. For instance, the CC may control operation of one or more active components of the converter.

In some examples, the CC may perform fault monitoring of the converter, the electrical generator, and/or any associated electrical busses. As one example, the CC may monitor electrical characteristics (e.g., current, voltage, resistance, frequency, etc.) at the input and/or output of the converter to determine whether or not a fault has occurred. For instance, the CC may determine that a fault has occurred where a current level at the output of the converter exceeds a current level threshold. As another example, the CC may monitor for other indications of fault occurrence. For instance, the CC may determine that a fault has occurred where an arc flash and/or smoke is detected.

The CC may perform one or more operations in response to determining that a fault has occurred. For instance, the responsive to determining that a fault has occurred in the converter, the CC may suspend operation/shutdown or otherwise modify operation of the converter. In this way, the CC may reduce the likelihood and/or severity of damage resulting from the fault (i.e., the CC may protect the converter).

Such modification of converter operation may result in a reduction in the amount of rotational mechanical energy consumed by the electrical generator. For instance, where the CC performs a shutdown of the converter, the electrical generator may cease consuming rotational mechanical energy from the gas turbine. This sudden loss of load (i.e., removal of rotational resistance) may cause the gas turbine to increase in speed (i.e., overspeed). Overspeed in a gas turbine may be undesirable as damage to the gas-turbine may occur.

In accordance with one or more techniques of this disclosure, the CC may reduce an amount of fuel provided to the gas-turbine responsive to detecting occurrence of a fault in the electrical converter. For instance, responsive to determining that a current level at an output of the converter exceeds a current level threshold, the CC may both shutdown the converter and reduce the amount of fuel provided to the gas-turbine. By reducing the amount of fuel provided to the gas-turbine, the CC may reduce the likelihood that that gas-turbine will suffer overspeed damage as a result of converter shutdown and corresponding load loss.

FIG. 1 is a conceptual block diagram in accordance with one or more techniques of this disclosure. As shown in FIG. 1, system 2 includes electrical bus 4, fuel distribution network 5, power unit 6, controllers 37A and 37B (collectively, "controllers 37"), AC/DC converter 42, fuel tank 60, and load 70. System 2 may be included in any vehicle, such as an aircraft, a wheeled or tracked vehicle, a locomotive, or a watercraft. In other examples, system 2 may be included in a building or other non-vehicle structure. System 2 may include additional components not shown in FIG. 1 or may not include some components shown in FIG. 1.

Electrical bus 4 provides electrical power interconnection between various components of system 2. Electrical bus 4 may include any combination of one or more direct current (DC) bus, one or more alternating current (AC) electrical bus, or combinations thereof. In the example of FIG. 1, electrical bus 4 may include a DC electrical bus configured to transport power from AC/DC converter 42 to load 70.

Fuel distribution network 5 provides transport of fuel amongst various components of system 2. For instance, fuel distribution network 5 may transport fuel from fuel tank 60 to gas-turbine 8. Fuel distribution network 5 may include one or more pumps, valves, regulators, flow monitors, and other components to facilitate the transport of fuel.

Fuel tank 60 may be configured to store fuel for use by various components of system 2. In some examples, fuel tank 60 may include a single fuel tank. In other examples, fuel tank 60 may include multiple fuel tanks distributed across various positions of system 2.

As shown in the example of FIG. 1, fuel distribution network 5 include fuel valve 64, which may be configured to control an amount of fuel provided to gas-turbine 8. Fuel valve 64 may be any type of valve capable of adjusting fuel flow. Examples of fuel valve 64 include, but are not limited to, gate valves, ball valves, butterfly valves, rotational valves, spool valves, etc.

Power unit 6 provides electrical power for use by various components of system 2. As shown in the example of FIG. 1, power unit 6 includes gas-turbine 8 and electrical machine 10. In operation, gas-turbine 8 consumes fuel (e.g., from fuel tank 60 via fuel distribution network 5) to produce rotational mechanical energy, which may be provided to electric machine 10 via drive shaft 7. Electric machine 10 converts the rotational mechanical energy into electrical energy.

Gas-turbine 8 may be any type of gas-turbine capable of generating mechanical energy using fuel. In some examples, gas-turbine 8 may be referred to as a prime mover. Gas-turbine 8 may include various sub-components. As one example, gas-turbine 8 may include one or more bleed valves capable of bleeding air from a compressor of gas-turbine 8. Bleeding air from the compressor may reduce the amount of mechanical energy generated by gas-turbine 8 (e.g., by slowing rotation of gas-turbine 8). As another example, gas-turbine 8 may include one or more components having variable geometry. For instance, gas-turbine 8 may be attached to a variable pitch propeller and/or may include one or more adjustable guide vanes. Adjusting the pitch of the propeller and/or adjusting the guide vanes may reduce the amount of mechanical energy generated by gas-turbine 8 (e.g., by slowing rotation of gas-turbine 8). As another example, gas-turbine 8 may include a rotational brake configured to, when activation is triggered, mechanically reduce a rotational speed of gas-turbine 8. For instance, gas-turbine 8 may include a hydraulic brake that selectively applies friction to a rotor attached to a spool of gas-turbine 8 in order to reduce a rotation speed of the spool, and thus slow down gas-turbine 8.

AC/DC converter 42 may operate as a rectifier to convert AC electrical power generated by one or more components of system 2 into DC electrical power. For instance, AC/DC converter 42 may convert AC electrical power generated by an electric generator (e.g., electric machine 10) into DC electrical power that is output via electrical bus 4. In some examples, AC/DC converter 42 may be an active converter in that AC/DC converter 42 includes one or more switches. In other words, AC/DC converter 42 may operate as a switched mode power converter.

Controllers 37 may be any type of controller capable of controlling operation of the corresponding devices/modules. As shown in FIG. 1, controllers 37 may include controller 37A and controller 37B. For instance, controller 37A may be an engine control unit (ECU) that may be partial authority or full authority (i.e., controller 37A may be a full authority digital engine controller (FADEC)). Controller 37A may be configured to control operation of the various sub-components of gas-turbine 8. For instance, controller 37A may control operation of the one or more bleed valves, the components having variable geometry, and the rotational brake.

In some examples, controllers 37A and 37B may be included in a single controller. In some examples, controller 37A and controller 37B may be separate controllers. For instance, as shown in FIG. 1, controller 37A may be a FADEC and controller 37B may be a separate controller. For instance, controller 37B may be configured to control operation of electric machine 10 and/or AC/DC converter 42. In some examples, controller 37B may be referred to as a converter controller in that controller 37B controls operation of AC/DC converter 42. As discussed in further detail below, controller 37B may be configured to monitor various aspects of the devices controlled by controller 37B. For instance, controller 37B may be configured to monitor electrical characteristics (e.g., voltage, current, and/or frequency), temperature, rotational speed, occurrence of arc flashes, presence of smoke, etc.

Controllers 37 may comprise any suitable arrangement of hardware, software, firmware, or any combination thereof, to perform the techniques attributed to controller 37 herein. Examples of controllers 37 include any one or more microprocessors, digital signal processors (DSPs), application specific integrated circuits (ASICs), field programmable gate arrays (FPGAs), or any other equivalent integrated or discrete logic circuitry, as well as any combinations of such components. When controllers 37 include software or firmware, controllers 37 further include any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controllers 37 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controllers 37 (e.g., may be external to a package in which one or more of controllers 37 is housed).

Load 70 may represent any load capable of consuming electrical power. Examples of load 70 include, but are not limited to, motors or inverters, batteries, electrical heaters, transformers, electromagnetic emitters, computers, transmitters, etc. As one example, load 70 may include an electrical motor configured to provide propulsion to a vehicle that includes system 2.

As discussed above, controller 37B may operate as a generator controller to control operation of at least AC/DC converter 42. For instance, where AC/DC converter 42 is an active converter, controller 37B may control operation of switches of AC/DC converter 42. Controller 37B may be configured to determine when a fault has occurred (e.g., within AC/DC converter 42 and/or electric machine 10). For instance, controller 37B may be configured to determine whether a fault has occurred that would result in a generator open circuit or significant loss of load.

To determine whether a fault has occurred, controller 37B may monitor various aspects of AC/DC converter 42. For instance, controller 37B may monitor various electrical characteristics of AC/DC converter 42. As one example, controller 37B may monitor (e.g., receive values representing) one of more of a voltage level, current level, and a frequency at an input of AC/DC converter 42 (e.g., electrical characteristics of the AC electrical power generated by electrical machine 10). As another example, controller 37B may monitor (e.g., receive values representing) one of more of a voltage level and a current level at an output of AC/DC converter 42 (e.g., electrical characteristics of the DC electrical power generated by AC/DC converter 42 and/or DC electrical power transported by electrical bus 4). As another example, controller 37B may monitor for arc flashes within AC/DC converter 42. For instance, controller 37B may be configured to receive a signal, from an arc flash detector positioned within AC/DC converter 42, indicating that an arc flash has occurred. As another example, controller 37B may monitor for smoke within AC/DC converter 42. For instance, controller 37B may be configured to receive a signal, from a smoke detector positioned within AC/DC converter 42, indicating the presence of smoke. As another example, controller 37B may monitor a temperature of AC/DC converter 42. For instance, controller 37B may receive a signal, from a temperature sensor (e.g., thermocouple) positioned on or within AC/DC converter 42, that indicates a temperature of AC/DC converter 42. As another example, controller 37B may monitor a temperature of electric machine 10. For instance, controller 37B may receive a signal, from a temperature sensor (e.g., thermocouple) positioned on or within electric machine 10, that indicates a temperature of electric machine 10. As another example, controller 37B may monitor the vibration, acceleration or shock loads of converter 42 or electrical machine 10.

Controller 37B may determine whether or not a fault has occurred based on the monitored characteristics. For instance, controller 37B may determine that a fault has occurred responsive to determining that a level of at least one of the electrical characteristics satisfies a corresponding threshold level. As one example, controller 37B may determine that a fault has occurred responsive to determining that a current level of AC/DC converter 42 (e.g., either at an input or an output) is greater than a threshold current level. As another example, controller 37B may determine that a fault has occurred responsive to determining that a voltage level of AC/DC converters 42 (e.g., either at an input or an output) is less than a threshold voltage level (e.g., indicating voltage collapse).

Controller 37B may determine that a fault has occurred based on factors in addition to, or as alternatives to, the electrical characteristics.

As one example, controller 37B may determine that a fault has occurred responsive to determining that arc flash has occurred within AC/DC converters 42.

As another example, controller 37B may determine that a fault has occurred responsive to determining that smoke has been detected within AC/DC converters 42.

As another example, controller 37B may determine that a fault occurred responsive to determining that a temperature of electric machine 10 (e.g., an electric generator) is greater than a generator temperature threshold. As such, controller 37B may determine that a fault occurred where electric machine 10 is overheating.

As another example, controller 37B may determine that a fault occurred responsive to determining that a temperature of AC/DC converter 42 (e.g., an electric converter) is greater than a converter temperature threshold. As such, controller 37B may determine that a fault occurred where AC/DC converter 42 is overheating.

As another example, controller 37B may determine that a fault occurred responsive to determining that a rate of change of a temperature of electric machine 10 is greater than a generator temperature rate threshold. As such, controller 37B may determine that a fault occurred where the temperature of electric machine 10 is rapidly increasing.

As another example, controller 37B may determine that a fault occurred responsive to determining that a rate of change of a temperature of AC/DC converter 42 is greater than a converter temperature rate threshold. As such, controller 37B may determine that a fault occurred where the temperature of AC/DC converter 42 is rapidly increasing.

As another example, controller 37B may determine that a fault occurred responsive to detecting high vibration, acceleration or shock loads of electrical machine 10 or converter 42.

As another example, controller 37B may determine that a fault occurred responsive to determining that a drive shaft (e.g., drive shaft 7) has failed (e.g., broken or sheared). In some examples, controller 37B may determine that the drive shaft has failed based on a rate of change of a speed of a rotor of electrical machine 10. For instance, as the rotation of the rotor of electrical machine 10 is driven by drive shaft 7, a break in drive shaft 7 will result in a rapid deceleration in the speed of the rotor of electrical machine 10. As such, controller 37B may determine that the drive shaft has failed responsive to determining that the rate of change of the speed of the rotor of electrical machine 10 is greater than a rotor deceleration threshold.

In some examples, controller 37B may receive a measurement that directly indicates the speed of the rotor of electrical machine 10. For instance, a rotational speed sensor included in electrical machine 10 may output a signal to controller 37B that directly indicates the speed of the rotor of electrical machine 10. In other examples, controller 37B may determine the speed of the rotor of electrical machine 10 based on other signals. For instance, as the speed of the rotor of electrical machine 10 may be directly proportional to the frequency of the electrical energy output by electrical machine 10, controller 37B may determine the speed of the rotor of electrical machine 10 based on a frequency of the AC electrical energy output by electrical machine 10.

The threshold levels and satisfying relationships may be pre-determined (e.g., pre-stored in a memory of controller 37B). For instance, controller 37B may include a memory storing one or more of: an input current threshold with an indication that a fault has occurred if the input current level is greater than the input current threshold, a maximum input voltage threshold with an indication that a fault has occurred if the input voltage level is greater than the maximum voltage threshold, a minimum input voltage threshold and an indication that a fault has occurred if the input voltage level is less than the minimum input voltage threshold, an output current threshold with an indication that a fault has occurred if the output current level is greater than the output current threshold, a minimum output voltage threshold with an indication that a fault has occurred if the output voltage level is less than the minimum output voltage threshold, a maximum output voltage threshold with an indication that a fault has occurred if the output voltage level is greater than the maximum output voltage threshold, a generator temperature threshold with an indication that a fault has occurred if the temperature of the electrical generator is greater than the generator temperature threshold, a converter temperature threshold with an indication that a fault has occurred if the temperature of the electrical converter is greater than the converter temperature threshold, a generator temperature rate threshold with an indication that a fault has occurred if the rate of change of the temperature of the electrical generator is greater than the generator temperature rate threshold, a converter temperature rate threshold with an indication that a fault has occurred if the rate of change of the temperature of the electrical converter is greater than the converter temperature rate threshold, and a rotor deceleration threshold with an indication that a fault has occurred if the rate of change of the speed of the rotor of the electrical generator is more negative than the rotor deceleration threshold.

Controller 37B may modify operation of AC/DC converter 42 responsive to determining that a fault has occurred. For instance, controller 37B may shutdown operation of AC/DC converter 42 responsive to determining that a fault has occurred. As one example, controller 37B may open switches in AC/DC converters 42 such that AC/DC converters 42 cease converting AC power into to DC power.

As discussed above, modifying operation of AC/DC converter 42 may result in a reduction in the amount of rotational mechanical energy consumed by electrical machine 10 (i.e., an electrical generator). For instance, where controller 37B performs a shutdown of AC/DC converter 42, electrical machine 10 may cease consuming rotational mechanical energy from gas-turbine 8. This sudden loss of load (i.e., removal of rotational resistance) may cause gas-turbine 8 to increase in speed (i.e., overspeed). Overspeed in gas-turbine 8 may be undesirable as damage to gas-turbine 8 may occur.

In accordance with one or more techniques of this disclosure, controller 37B may reduce an amount of fuel provided to gas-turbine 8 responsive to detecting occurrence of the fault in AC/DC converter 42. In some examples, controller 37B may reduce the amount of fuel provided to gas-turbine 8 to zero. In other examples, controller 37B may reduce the amount of fuel provided to gas-turbine 8 to an amount greater than zero but less than the amount pre-reduction. For instance, controller 37B may reduce the amount of fuel provided to gas-turbine 8 to an amount sufficient for gas-turbine 8 to operate at idle speed. By reducing the amount of fuel provided to gas-turbine 8, controller 37B may reduce the likelihood that gas-turbine 8 will suffer overspeed damage as a result of converter shutdown and corresponding load loss.

Controller 37B may perform one or more operations to reduce the likelihood that gas-turbine 8 will suffer overspeed damage as a result of converter shutdown additionally or alternatively to reducing the amount of fuel provided to gas-turbine 8.

As one example, controller 37B may cause a modification of a geometry of gas-turbine 8 (e.g., of guide vanes or propeller pitch). For instance, controller 37B may output a signal that causes one or more guide vanes of gas-turbine 8 to change state in order to reduce the amount of power generated by gas-turbine 8 (e.g., to drive gas-turbine 8 into a surge/compressor stall). In examples, controller 37B may output the signal directly to the guide vanes (e.g., to actuators of the guide vanes). In other examples, controller 37B may output the signal to a controller of the guide vanes. For instance, controller 37B may output a request to controller 37A to change the state of the guide vanes.

As another example, controller 37B may cause a modification of a bleed valve of gas-turbine 8. For instance, controller 37B may output a signal that causes one or more bleed valves of gas-turbine 8 to open, or open further. In some examples, controller 37B may output the signal directly to the bleed valve (e.g., to an actuator of the bleed valve). In other examples, controller 37B may output the signal to a controller of the bleed valve. For instance, controller 37B may output a request to controller 37A to change the state of the bleed valve.

As another example, controller 37B may trigger application of a rotational brake of gas-turbine 8. For instance, controller 37B may output a signal that causes a rotational brake of gas-turbine 8 to apply friction, or an increased amount of friction, to slow the rotation of gas-turbine 8. In some examples, controller 37B may output the signal directly to the rotational brake (e.g., to an actuator of the rotational brake). In other examples, controller 37B may output the signal to a controller of the rotational brake. For instance, controller 37B may output a request to controller 37A to change the amount of braking provided by the rotational brake.

Controller 37B may use any combination of the above techniques to reduce the speed of gas-turbine 8. For instance, responsive to determining that a fault has occurred, controller 37B may use any combination of fuel reduction, geometry modification, bleed valve adjustment, and/or brake application, to reduce the speed of gas-turbine 8.

In some examples, fuel valve 64 may be an "energize to open" valve (e.g., a latching shutoff valve) in that fuel valve 64 may close (e.g., such that gas-turbine 8 receives zero fuel) unless a signal is continuously received. For instance, when a fault is not detected, controller 37B may constantly output a signal (e.g., a constant 28 volt DC) signal to fuel valve 64. Responsive to detecting a fault, controller 37B may cease outputting the signal. As such, controller 37B may cause fuel valve 64 to close responsive to detecting the fault.

In some examples, controller 37B may reduce the amount of fuel provided to gas-turbine 8, and/or perform one or more of the other speed reducing operations, with a particular temporal relationship to modifying operation of AC/DC converter 42. As one example, controller 37B may reduce the amount of fuel provided to gas-turbine 8 before shutting down AC/DC converter 42. As another example, controller 37B may reduce the amount of fuel provided to gas-turbine 8 contemporaneously with shutting down AC/DC converter 42. As another example, controller 37B may reduce the amount of fuel provided to gas-turbine 8 after shutting down AC/DC converter 42.

In some examples, controller 37B may perform one or more additional actions to prevent system damage. For instance, controller 37B may include interlock functionality to prevent starting of gas-turbine 8 when a fault is detected within AC/DC converters 42.

As discussed above, controller 37A may be a FADEC that controls at least the operating speed of gas-turbine 8, and controller 37B may be a separate controller. In some examples, controller 37B may detect the occurrence of a fault and cause the reduction of fuel flow without involvement of controller 37A. This arrangement may provide one or more advantages. As one example, as communication with additional controllers (i.e., controller 37A) may take time, performing the fault detection and fuel shutoff without the involvement of additional controllers may reduce the reaction time (e.g., by 10 to 50 milliseconds). In this way, controller 37A may perform the fault detection and fuel flow reduction without sending controller 37A a request to reduce the operating speed of gas-turbine 8. By reducing the amount of fuel provided to gas-turbine 8 without sending controller 37A a request to reduce the operating speed of gas-turbine 8, controller 37B may more quickly reduce the speed of gas-turbine 8, thus reducing the likelihood that gas-turbine 8 will suffer overspeed damage as a result of converter shutdown and corresponding load loss.

While illustrated in FIG. 1 as including a single power unit, systems 2 is not so limited. For instance, system 2 may include multiple power units. In some examples where system 2 includes multiple power units 6, each respective power unit 6 may include its own respective controller that performs the functions of controller 37B. Therefore, in such examples, the amount of fuel provided to the gas-turbine of each respective power unit may be respectively and independently reduced by the respective controller. Additionally, in some examples, the controllers of the various power units may communicate. As such, in the event that a controller of a first power unit detects a fault that is applicable to a second power unit (e.g., bus voltage collapse), the controller of the first power unit may reduce the fuel provided to the gas-turbine of the first power unit and output a message to a controller of the second power unit to reduce the fuel provided to the gas-turbine of the second power unit.

Figure 2:
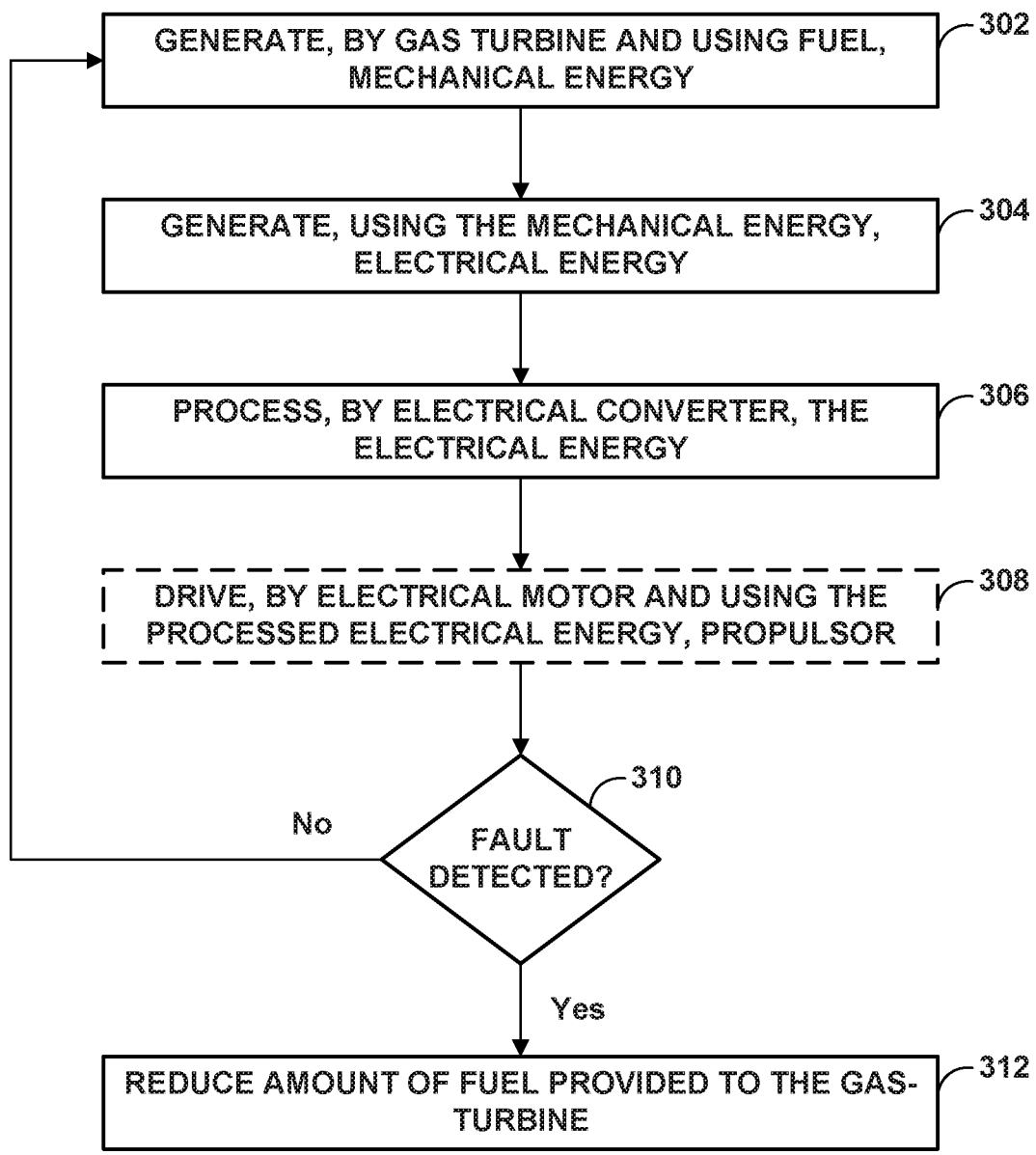
FIG. 2 is a flowchart illustrating an example process for providing overspeed protection of a gas-turbine, in accordance with one or more techniques of this disclosure.

FIG. 2 is a flowchart illustrating an example process for providing overspeed protection of a gas-turbine, in accordance with one or more techniques of this disclosure. The techniques of FIG. 2 may be performed by components of a system, such as system 2 of FIG. 1.

A gas-turbine of system 2 may generate, using fuel, mechanical energy (302). For instance, gas-turbine 8 of FIG. 1 may generate mechanical energy using fuel provided by fuel tank via fuel valve 64. As shown in FIG. 1, gas-turbine 8 may output the generated mechanical energy via drive shaft 7.

An electrical machine of system 2 may generate, using the mechanical energy, electrical energy (304). For instance, electrical machine 10 of FIG. 1 may generate AC electrical energy using the mechanical energy received from gas-turbine 8 via drive shaft 7.

An electrical converter of system 2 may process the electrical energy (306). For instance, AC/DC converter 42 of FIG. 1 may rectify the AC electrical energy generated by electrical machine 10 into DC electrical energy for output via electrical bus 4. As discussed above, operation of AC/DC converter 42 may be controlled by a converter controller, such as controller 37B of FIG. 1.

A load of system 2 may consume the processed electrical energy. As one example, an electrical motor of system 2 may drive, using the processed electrical energy, a propulsor (308).

A controller of system 2 may determine whether a fault has occurred (310). For instance, controller 37B of FIG. 1 may determine whether a fault has occurred in AC/DC converters 42. Where the controller determines that a fault has not occurred, the controller may refrain from reducing the amount of fuel provided to the gas-turbine, and the gas-turbine may continue to generate mechanical energy using fuel (302).

However, in response to determining that a fault has occurred, the controller may reduce the amount of fuel provided to the gas-turbine (312). As one example, controller 37B may reduce, to a level greater than zero, the amount of fuel provided to gas-turbine 8. As another example, controller 37B may reduce, to zero, the amount of fuel provided to gas-turbine 8.

In addition to reducing the amount of fuel provided to the gas-turbine, the controller may perform one or more operations to protect the electrical converter from damage due to the fault. For instance, controller 37B may deactivate AC/DC converter 42 in response to determining that the fault has occurred.

As discussed above, in some examples, system 2 may perform one or more operations to reduce the speed of the gas-turbine in addition to, or as alternatives to, reducing the amount of fuel provided to the gas-turbine. For instance, responsive to determining that a fault has occurred, controller 37B may perform any combination of fuel reduction, geometry modification, bleed valve adjustment, and/or brake application, to reduce the speed of gas-turbine 8.

As one specific example, system 2 may determine that a fault has occurred in response to determining that a drive shaft coupling the electrical generator to the gas-turbine has failed based on a deceleration rate of a rotor of the electric generator. For instance, controller 37B may determine that drive shaft 7 has failed (e.g., broken or sheared) based on a deceleration rate of a rotor of electric machine 10. In response to determining that drive shaft 7 failed, controller 37B may perform any of the aforementioned options to reduce the speed of gas-turbine 8. In this way, system 2 may prevent overspeed of the gas-turbine in the event of a drive shaft failure.

As another specific example, system 2 may determine that a fault has occurred in response to determining that the gas-turbine has experienced a combustor flameout, surge, or other such failure (e.g., fuel valve failure). For instance, based on the monitored electrical characteristics of electric machine 10, controller 37B may determine whether gas-turbine 8 has experienced a combustor flameout, surge, or other such failure. In response to determining that gas-turbine 8 experienced the failure, controller 37B may perform any of the aforementioned options to reduce the speed of gas-turbine 8. In this way, controller 37B may provide redundant engine shutdown functionality in the event a primary controller of the engine (e.g., controller 37A) has failed.

The following examples may illustrate one or more aspects of the disclosure:

Example 1

A system comprising: a gas-turbine configured to generate mechanical energy using fuel; an electrical generator configured to generate electrical energy using the mechanical energy generated by the gas-turbine; an electrical converter configured to process the electrical energy generated by the electrical generator; and a converter controller configured to reduce, responsive to detecting occurrence of a fault in the electrical converter, an amount of fuel provided to the gas-turbine.

Example 2

The system of example 1, wherein to reduce the amount of fuel provided to the gas-turbine, the converter controller is configured to cause a fuel value to provide zero fuel to the gas-turbine.

Example 3

The system of any combination of examples 1 or 2, wherein, to reduce the amount of fuel provided to the gas-turbine, the converter controller is configured to output an electrical pulse to a fuel valve.

Example 4

The system of any combination of examples 1-3, wherein the converter controller is configured to: monitor electrical characteristics of the electrical converter; and detect the occurrence of the fault responsive to determining that a level of at least one of the electrical characteristics satisfies a corresponding threshold level.

Example 5

The system of example 4, wherein: to monitor the electrical characteristics, the converter controller is configured to monitor an electrical current level of the electrical converter, to determine that at a level of at least one of the electrical characteristics satisfies a corresponding threshold level, the converter controller is configured to determine that the electrical current level of the electrical converter is greater than a threshold electrical current level.

Example 6

The system of any combination of examples 1-5, wherein: to monitor the electrical characteristics, the converter controller is configured to monitor a voltage level of the electrical converter, to determine that at a level of at least one of the electrical characteristics satisfies a corresponding threshold level, the converter controller is configured to determine that the voltage level of the electrical converter is less than a minimum threshold voltage level or greater than a maximum threshold voltage level.

Example 7

The system of any combination of examples 1-6, wherein the converter controller is configured to one or more of: detect occurrence of the fault responsive to detecting occurrence of an arc flash in the electrical converter; detect occurrence of the fault responsive to detecting smoke in the electrical converter; detect occurrence of the fault responsive to determining that a temperature of the electrical generator is greater than a generator temperature threshold; detect occurrence of the fault responsive to determining that a temperature of the electrical converter is greater than a converter temperature threshold; detect occurrence of the fault responsive to determining that a rate of change of the temperature of the electrical generator is greater than a generator temperature rate threshold; detect occurrence of the fault responsive to determining that a rate of change of the temperature of the electrical converter is greater than a converter temperature rate threshold; and detect occurrence of the fault responsive to determining that a rate of change of a speed of a rotor of the electrical generator is more negative than a rotor deceleration threshold.

Example 8

The system of example 7, wherein the converter controller is configured to determine the rate of change of the speed of a rotor based on a frequency of the electrical energy generated by the electrical generator.

Example 9

The system of any combination of examples 1-8, wherein the converter controller is further configured to modify operation of the converter in response to detecting the occurrence of the fault in the electrical converter.

Example 10

The system of any combination of examples 1-9, further comprising: an engine controller that is different than the converter controller, wherein the engine controller is a full authority digital engine control (FADEC) configured to control the gas-turbine.

Example 11

The system of any combination of examples 1-10, wherein, responsive to detecting the occurrence of the fault in the electrical converter, the converter controller is further configured to one or more of: cause a modification of a geometry of the gas-turbine; cause a modification of a bleed valve of the gas-turbine; and trigger application of a rotational brake of the gas-turbine.

Example 12

A method comprising: controlling, by a converter controller, operation of an electrical converter configured to process electrical energy generated by an electrical generator from mechanical energy derived from a gas-turbine; detecting, by the converter controller, occurrence of a fault in the electrical converter; and responsive to detecting the occurrence of the fault, reducing, by the converter controller, an amount of fuel provided to the gas-turbine.

Example 13

The method of example 12, reducing the amount of fuel provided to the gas-turbine comprise causing, by the converter controller, a fuel value to provide zero fuel to the gas-turbine.

Example 14

The method of any combination of examples 12 or 13, wherein reducing the amount of fuel provided to the gas-turbine comprises outputting, by the converter controller, an electrical pulse to a fuel valve.

Example 15

The method of any combination of examples 12-14, further comprising: monitoring electrical characteristics of the electrical converter; and detecting the occurrence of the fault responsive to determining that a level of at least one of the electrical characteristics satisfies a corresponding threshold level.

Example 16

The method of example 15, wherein one or both of: determining that at a level of at least one of the electrical characteristics satisfies a corresponding threshold level comprises determining that an electrical current level of the electrical converter is greater than a threshold electrical current level; and determining that at a level of at least one of the electrical characteristics satisfies a corresponding threshold level comprises determining that an electrical voltage level of the electrical converter is less than a minimum threshold electrical voltage level or greater than a maximum electrical voltage level.

Example 17

The method of any combination of examples 12-16, further comprising one or more of: detecting occurrence of the fault responsive to detecting occurrence of an arc flash in the electrical converter; detecting occurrence of the fault responsive to detecting smoke in the electrical converter; detecting occurrence of the fault responsive to determining that a temperature of the electrical generator is greater than a generator temperature threshold; detecting occurrence of the fault responsive to determining that a temperature of the electrical converter is greater than a converter temperature threshold; detecting occurrence of the fault responsive to determining that a rate of change of the temperature of the electrical generator is greater than a generator temperature rate threshold; detecting occurrence of the fault responsive to determining that a rate of change of the temperature of the electrical converter is greater than a converter temperature rate threshold; and detecting occurrence of the fault responsive to determining that a rate of change of a speed of a rotor of the electrical generator is greater than a rotor deceleration threshold.

Example 18

The method of any combination of examples 12-17, further comprising: controlling, by a full authority digital engine control (FADEC) that is different than the converter controller, the gas-turbine.

Example 19

The method of any combination of examples 12-18, further comprising, responsive to detecting the occurrence of the fault in the electrical converter, one or more of: causing a modification of a geometry of the gas-turbine; causing a modification of a bleed valve of the gas-turbine; and triggering application of a rotational brake of the gas-turbine.

Example 20

A vehicle comprising: a gas-turbine configured to generate mechanical energy using fuel; a fuel valve configured to control an amount of fuel provided to the gas-turbine; an electrical generator configured to generate electrical energy using mechanical energy derived from the gas-turbine; an electrical converter configured to process the electrical energy generated by the electrical generator; a converter controller coupled to the electrical converter and the fuel valve, the converter controller configured to cause the fuel valve to reduce, responsive to detecting occurrence of a fault in the electrical converter, an amount of fuel provided to the gas-turbine.

Example 21

A system comprising means for performing the method of any combination of examples 12-19.

Example 22

A computer-readable storage medium storing instructions that, when executed, cause one or more processors of a converter controller to perform the method of any combination of examples 12-19.

Various examples have been described. These and other examples are within the scope of the following claims.

What is claimed is:

1. A system comprising:
a gas-turbine configured to generate mechanical energy using fuel that flows through a fuel valve;
an engine controller configured to control operation of the gas-turbine;
an electrical generator configured to generate alternating current (AC) electrical energy using the mechanical energy generated by the gas-turbine;
an electrical converter comprising a rectifier configured to convert the AC electrical energy generated by the electrical generator into direct current (DC) electrical energy; and
a converter controller that is different than the engine controller, the converter controller configured to reduce, responsive to detecting occurrence of a fault in the rectifier, an amount of fuel provided to the gas-turbine by at least outputting, without involvement of the engine controller, a signal directly to the fuel value that causes the fuel value to provide zero fuel to the gas-turbine.

2. The system of claim 1, wherein, to output the signal, the converter controller is configured to output an electrical pulse to the fuel valve.

3. The system of claim 1, wherein the converter controller is configured to:
monitor electrical characteristics of the rectifier; and
detect the occurrence of the fault responsive to determining that a level of at least one of the electrical characteristics satisfies a corresponding threshold level.

4. The system of claim 3, wherein:
to monitor the electrical characteristics, the converter controller is configured to monitor an electrical current level of the rectifier,
to determine that at a level of at least one of the electrical characteristics satisfies a corresponding threshold level, the converter controller is configured to determine that the electrical current level of the rectifier is greater than a threshold electrical current level.

5. The system of claim 3, wherein:
to monitor the electrical characteristics, the converter controller is configured to monitor a voltage level of the rectifier,
to determine that at a level of at least one of the electrical characteristics satisfies a corresponding threshold level, the converter controller is configured to determine that the voltage level of the rectifier is less than a minimum threshold voltage level or greater than a maximum threshold voltage level.

6. The system of claim 1, wherein the converter controller is configured to one or more of:
detect occurrence of the fault responsive to detecting occurrence of an arc flash in the electrical converter;
detect occurrence of the fault responsive to detecting smoke in the electrical converter;
detect occurrence of the fault responsive to determining that a temperature of the electrical generator is greater than a generator temperature threshold;
detect occurrence of the fault responsive to determining that a temperature of the electrical converter is greater than a converter temperature threshold;
detect occurrence of the fault responsive to determining that a rate of change of the temperature of the electrical generator is greater than a generator temperature rate threshold;

detect occurrence of the fault responsive to determining that a rate of change of the temperature of the electrical converter is greater than a converter temperature rate threshold;

detect occurrence of the fault responsive to determining that one or more of vibration, acceleration, or shock loads of the electrical machine or electrical converter exceed a corresponding threshold; and detect occurrence of the fault responsive to determining that a rate of change of a speed of a rotor of the electrical generator is more negative than a rotor deceleration threshold.

7. The system of claim 6, wherein the converter controller is configured to:

monitor a frequency of the electrical energy generated by the electrical generator; and determine the rate of change of the speed of a rotor based on the frequency of the electrical energy generated by the electrical generator.

8. The system of claim 1, wherein the converter controller is further configured to modify operation of the converter in response to detecting the occurrence of the fault in the electrical converter.

9. The system of claim 1, wherein the engine controller is a full authority digital engine control (FADEC) configured to control the gas-turbine.

10. The system of claim 1, wherein, responsive to detecting the occurrence of the fault, the converter controller is further configured to one or more of:

cause a modification of a geometry of the gas-turbine;

cause a modification of a bleed valve of the gas-turbine; and trigger application of a rotational brake of the gas-turbine.

11. A method comprising:

controlling, by a converter controller, operation of an electrical converter comprising a rectifier configured to convert alternating current (AC) electrical energy generated by an electrical generator from mechanical energy derived from a gas-turbine into direct current (DC) electrical energy, wherein the converter controller is different than an engine controller that controls operation of the gas-turbine;

detecting, by the converter controller, occurrence of a fault in the rectifier; and responsive to detecting the occurrence of the fault, reducing, by the converter controller, an amount of fuel provided to the gas-turbine by at least outputting, without involvement of the engine controller, a signal directly to a fuel value that causes the value to provide zero fuel to the gas-turbine.

12. The method of claim 11, wherein outputting the signal comprises outputting, by the converter controller, an electrical pulse to the fuel valve.

13. The method of claim 11, further comprising:

monitoring electrical characteristics of the rectifier; and detecting the occurrence of the fault responsive to determining that a level of at least one of the electrical characteristics satisfies a corresponding threshold level.

14. The method of claim 13, wherein one or both of:

determining that at a level of at least one of the electrical characteristics satisfies a corresponding threshold level comprises determining that an electrical current level of the rectifier is greater than a threshold electrical current level; and determining that at a level of at least one of the electrical characteristics satisfies a corresponding threshold level comprises determining that an electrical voltage level of the rectifier is less than a minimum threshold electrical voltage level or greater than a maximum electrical voltage level.

15. The method of claim 11, further comprising one or more of:

detecting occurrence of the fault responsive to detecting occurrence of an arc flash in the electrical converter;

detecting occurrence of the fault responsive to detecting smoke in the electrical converter;

detecting occurrence of the fault responsive to determining that a temperature of the electrical generator is greater than a generator temperature threshold;

detecting occurrence of the fault responsive to determining that a temperature of the electrical converter is greater than a converter temperature threshold;

detecting occurrence of the fault responsive to determining that a rate of change of the temperature of the electrical generator is greater than a generator temperature rate threshold;

detecting occurrence of the fault responsive to determining that a rate of change of the temperature of the electrical converter is greater than a converter temperature rate threshold; and detecting occurrence of the fault responsive to determining that a rate of change of a speed of a rotor of the electrical generator is more negative than a rotor deceleration threshold.

16. The method of claim 11, wherein the engine controller comprises a full authority digital engine control (FADEC).

17. The method of claim 11, further comprising, responsive to detecting the occurrence of the fault, one or more of:

causing a modification of a geometry of the gas-turbine;

causing a modification of a bleed valve of the gas-turbine; and triggering application of a rotational brake of the gas-turbine.

18. A vehicle comprising:

a gas-turbine configured to generate mechanical energy using fuel;

an engine controller configured to control operation of the gas-turbine;

a fuel valve configured to control an amount of fuel provided to the gas-turbine;

an electrical generator configured to generate alternating current (AC) electrical energy using mechanical energy derived from the gas-turbine;

an electrical converter comprising a rectifier configured to process the AC electrical energy generated by the electrical generator into direct current (DC) electrical energy; and a converter controller coupled to the electrical converter and the fuel valve, the converter controller configured to cause the fuel valve to reduce, responsive to detecting occurrence of a fault in the rectifier, an amount of fuel provided to the gas-turbine by at least outputting, without involvement of the engine controller, a signal directly to the fuel value that causes the fuel value to provide zero fuel to the gas-turbine.

* * * * *